United States Patent [19]

Sidline

[11] 3,736,565

[45] May 29, 1973

[54] PROGRAMMABLE TRANSPORT CONTROLLER

[75] Inventor: George B. Sidline, Belmont, Calif.

[73] Assignee: Ampex Corporation, Redwood City, Calif.

[22] Filed: Nov. 16, 1970

[21] Appl. No.: 89,567

[52] U.S. Cl. .............................340/172.5, 340/174.1

[51] Int. Cl. .............................................G06f 13/04

[58] Field of Search .......................340/172.5, 174.1; 235/157; 178/6.6

[56] References Cited

UNITED STATES PATENTS

| | | | |
|---|---|---|---|
| 3,594,729 | 7/1971 | Uemura | 340/172.5 |
| 3,579,195 | 5/1971 | Hallmark | 340/172.5 |
| 3,294,902 | 12/1966 | Maxey | 178/6.6 |
| 3,571,801 | 3/1971 | Coolidge | 340/172.5 |
| 3,588,840 | 6/1971 | Nomura | 340/172.5 |

*Primary Examiner*—Paul J. Henon
*Assistant Examiner*—Mark Edward Nusbaum
*Attorney*—Robert G. Clay

[57] ABSTRACT

A magnetic head is located to reproduce signals recorded in binary notation along a track of magnetic video tape to identify its frames. The frame identifying signals carry clock and address signal information and are recorded in a code to address consecutive frames sequentially. As the magnetic tape is advanced to position a particular frame at the magnetic head location, the frame identifying signals are reproduced and decoded to obtain the frame address signals and the clock signal. The reproduced frame address signals are compared to the address signal of the particular frame to generate signals representative of the distance the particular frame must be advanced to position it at the magnetic head. The clock signal obtained from the decoded frame identifying signals is coupled to an adjustable frequency divider. When the particular frame is further than a certain distance from the magnetic head location, the tape transport is commanded to advance the tape at the maximum possible speed. As the particular frame is advanced to be within each of certain ranges of distances of the magnetic head location, the corresponding distance representative signal sets the divider to divide the frequency of reproduced clock signal by one of a set of selected numbers. The divided clock signal frequency is compared to a reference frequency signal to command the tape transport drive motor to advance the magnetic tape at a speed corresponding to a clock signal frequency which, after being divided, equals the frequency of the reference frequency signal. The distance representative signal is coupled to stop the advance of the tape when the particular frame arrives at the magnetic head location.

21 Claims, 6 Drawing Figures

INVENTOR
GEORGE B. SIDLINE
BY [signature]
ATTORNEY

INVENTOR.
GEORGE B. SIDLINE

BY Ralph L. Morris

ATTORNEY

INVENTOR.
GEORGE B. SIDLINE
BY Ralph L Mossino
ATTORNEY

PROGRAMMABLE TRANSPORT CONTROLLER

FIELD OF INVENTION

The present invention relates to positioning a transported record medium for storing information. More particularly, it relates to positioning the transported record medium by adjusting its transport speed according to the distance a particular storage location of the record medium is to be transproted.

BACKGROUND OF THE INVENTION

Many large capacity information storage systems employ a transported record medium for storing information in the form of either a recorded reproduction or a recorded representation of the original information. In these storage systems, the record medium has several, usually, uniformly sized discrete storage locations and is moved by a transport mechanism operated to position a particular one of its discrete storage locations relative to suitable means for transferring information between the record medium and an information processing system. The method and apparatus of the present invention is particularly useful for positioning magnetic tapes for magnetically storing video images. Hence, the description of the present invention will be explained in connection with positioning a magnetic tape relative to magnetic heads for transferring information between the tape and a suitable information processing system. However, as will be understood by those skilled in the art, the method and apparatus of the present invention is equally useful for positioning other transported record media.

In information storage systems employing a transported record medium for storing information, access time depends greatly upon how quickly the record medium can be transported to position its requested storage location for access by the means for entering or retrieving information therefrom. For a particular transport mechanism, access time will be shortest if the record medium is accelerated for one-half the distance the requested storage location is required to be transported to position it at the selected location and decelerated for the other half of the distance, with the acceleration and deceleration following a parabolic speed trajectory. However, because the highest possible speed a record medium can be transported is limited by the terminal velocity of the record medium's transport mechanism, it is not possible to maintain the acceleration of the record medium once the terminal velocity of the transport mechanism is reached. Even when the record medium is able to reach the terminal velocity of the transport mechanism, access time will be shortest if the record medium is accelerated and decelerated along a parabolic speed trajectory to transport the record medium at the highest average speed which will position a particular storage location at a selected location without reversing the direction of transport of the record medium more than once. In my copending U. S. application, Ser. No. 801,100, filed Feb. 20, 1969, for "Method and Apparatus for Transporting a Recording Medium for Storing Information," and assigned to the Assignee of this application, now U.S. Pat. No. 3,641,504 a system is described for controlling the acceleration and deceleration of a record medium to rapidly position a particular storage location thereof at a desired location. As described therein, the record medium is accelerated and decelerated in accordance with the deceleration characteristic of the record medium's transport mechanism whereby, to position one of its storage locations, the record medium is accelerated and decelerated for about equal distances to transport the record medium close to the highest possible average speed as limited by the terminal velocity of the record medium's transport mechanism.

While the technique described in my above-identified copending application improved the access time of such information storage systems, certain limitations are imposed by the manner in which the transport of a record medium is controlled to position a particular storage location. One important limitation is found in the use of a tachometer having a timing mechanism which is operated synchronously with the transport of the record medium. Although such tachometers are extensively used to perform such control functions, their use often requires the marriage of electrical, mechanical and optical technologies. If the tachometers could be eliminated while retaining the ability to control transported record media without the addition of other complex control systems, the construction of information storage systems would be greatly simplified.

Another significant limitation of the technique described in my copending application is the variation in resolution of the control system with the speed at which the record medium is transported. In the system described in my copending application, as the record medium's speed is reduced, the frequency of the reference frequency signal coupled to the comparator is decreased. Consequently, at lower record medium speeds, the smallest difference between the reference frequency and tachometer frequency that the comparator can resolve is a greater percentage of the desired record medium speed. Such reduced, low-speed resolution hinders the precise control of the record medium's acceleration and deceleration.

Systems commonly employed to control the acceleration and deceleration of record medium transports are designed according to a particular transport deceleration characteristic and according to a fixed quantity of information per unit length of record medium, i.e., information packing density, used to determine the distance a particular storage location must be transported to be positioned. Hence, if the deceleration characteristic changes, or if the distance related information packing density changes, such acceleration and deceleration control systems must be redesigned to maintain the proper relationship between the location of the particular storage location being positioned, the acceleration and deceleration of the record media, and the deceleration characteristic of the transport. Such changes may occur, for example, when the transport mechanism or the tachometer's timing mechanism is changed.

Considerable advantage is therefore to be gained by controlling the acceleration and deceleration of a transported record medium in accordance with the deceleration characteristic of the recording medium's transport without the necessity of employing a tachometer. Additional advantages are to be gained by providing a controller for controlling the acceleration and deceleration of a transported record medium which may be programmed to issue sets of speed change commands according to different quantities of information per unit length of the record medium for effecting acceleration and deceleration of the record medium.

SUMMARY OF THE INVENTION

Accordingly, it is an object of this invention to control the acceleration and deceleration of a record medium in accordance with position and timing information obtained from data recorded along a track of the record medium.

More particularly, it is an object of this invention to control the acceleration and deceleration of a record medium in accordance with position information derived from addresses recorded along the record medium to identify the discrete storage locations thereof:

Furthermore, it is an object of this invention to control the acceleration and deceleration of a record medium to transport it close to the highest possible average speed in positioning a particular storage location thereof at a selected location.

Another object of this invention is to provide a single controller for controlling the acceleration and deceleration of record media transported by transport mechanisms having different deceleration characteristics.

It is another object of this invention to provide a single controller for controlling the acceleration and deceleration of different record media in accordance with position and timing information recorded along a track of the different record media to identify the storage locations thereof which position information is recorded along different ones of the record media at different recording speeds.

Still, a further object of this invention is to provide a controller for controlling the acceleration and deceleration of different magnetic video tapes for recording television signals of different scanning standards.

According to the present invention, the acceleration and deceleration of a transported record medium is controlled to position a particular one of its discrete storage locations by detecting and operating on address signals recorded along the record medium to identify each of the discrete storage locations. Each address signal contains information from which can be determined the distance separating the storage location it identifies from any other storage location of the record medium. As the record medium is transported to position a particular one of its storage locations, the detected address signals are compared to the address signal identifying the particular storage location to obtain a signal representative of the distance the particular storage location must be transported to be positioned. A clock signal, also recorded along the record medium either together with or separate from the address signals, is detected and coupled for comparison with a reference signal of constant frequency to generate signals to command the record medium's transport mechanism to drive the record medium at a particular speed. The speed at which the transport mechanism is commanded to drive the record medium corresponds to a clock signal frequency which, as coupled for comparison with the reference signal, equals the frequency of the reference signal. When the distance representative signal indicates the particular storage location is predetermined distances from the desired position, the frequency of either the reference or detected clock signals is changed by selected increments to effect changes in the record medium's transport drive signal. The predetermined distances and the increment changes are selected so that the record medium is accelerated and decelerated according to the deceleration characteristic of its transport mechanism while being transported at close to the highest possible average speed to position the particular storage location.

To maintain the resolution of the transport control system over the entire range of speeds at which the record medium is transported, the transport drive signal is changed by incrementally increasing the frequency of the signal derived from the clock signal and coupled for comparison with the reference signal each time the particular storage location is transported through each of the positions which is one of the selected distances from the desired position. With a recorded clock signal frequency which is equal to or greater than the reference signal frequency at the lowest speed the record medium is transported, these increases are effected by frequency division. With a recorded clock signal frequency which, at the highest speed the record medium is transported, provides a reproduce clock signal frequency equal to or less than the reference signal frequency, these increases are effected by frequency multiplication. Frequency division and multiplication are combined for intermediate clock signal frequencies.

A versatile record medium transport controller can be realized by arranging the frequency increasing device and the reference signal generator so that various combinations of reference signal frequencies and frequency changes can be obtained. With these various combinations, it is possible to generate sets of transport drive signals for different quantities of information per unit length of transported record medium determining the distance the particular storage location must be transported to be positioned. This enables arranging the issuance of transport drive signals to accommodate different deceleration characteristics or different packing densities of information recorded along the record medium indicative of its unit length. As will become more apparent from the detailed description of the preferred embodiment, this feature is particularly important when it is desired to employ a single transport controller to control the transport of different television video tapes having information recorded therealong at different recording speeds or in different field scanning standards.

BRIEF DESCRIPTION OF THE DRAWINGS

The foregoing as well as other objects and advantages of the present invention will become more apparent upon the consideration of the following detailed description and claims together with the accompanying drawings of which:

DESCRIPTION OF THE PREFERRED EMBOIDMENT

Figure 1:
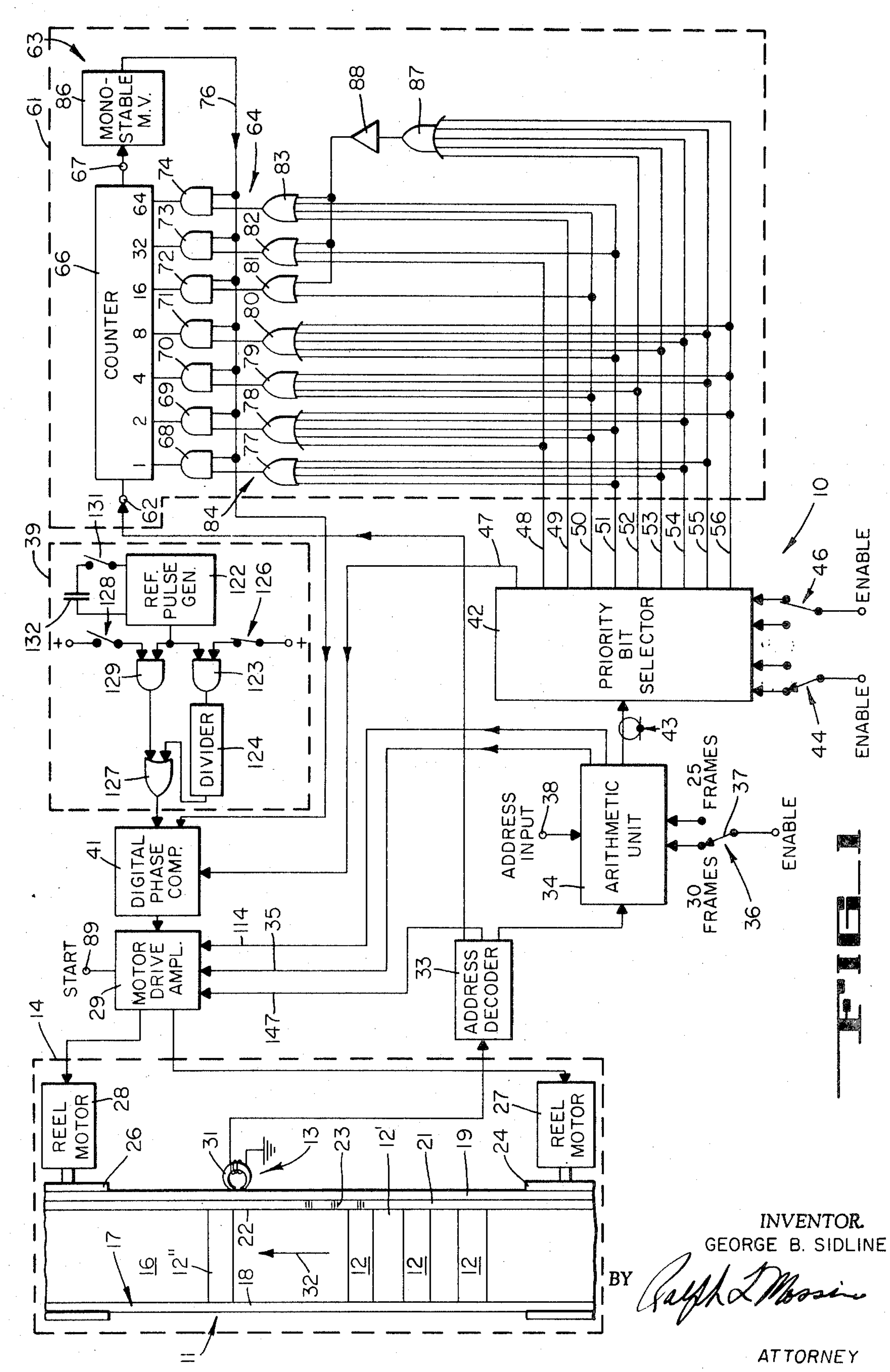
FIG. 1 is a schematic block diagram of an embodiment of the transport controller of the present invention.

The control of the acceleration and deceleration of a magnetic record medium to position a particular one of its storage locations in accordance with the present invention will be described with reference to the control of magnetic video tapes commonly employed to record television signals. The system illustrated in FIG. 1 is a servo transport control system 10 coupled to receive signals reproduced from a video tape 11 from which can be determined the distance a particular storage location or frame 12' of the tape must be advanced to position it at a desired location 13. Depending upon the distance represented by the reproduced signals, the tape's transport mechanism 14 is commanded to advance the tape 11 at one of several different speeds whereby, as the particular frame 12' is advanced towards the location 13, the tape 11 is accelerated and decelerated according to the deceleration characteristic of its transport mechanism 14.

Referring more specifically to FIG. 1, video tape 11 commonly used for recording television signals has a width of 2 inches and a length of 7,000 feet. Four separate recording tracks are provided along the tape 11; a video track portion 16 for recording frames 12 of television program material, an audio track portion 17 longitudinally extending along one edge 18 of the viedo track 16, and adjacent control track 19 and cue track 21 longitudinally coextending along the other edge 22 of the video track 16.

A unique frame identifying signal 23 is recorded along the cue track 21 for each frame 12 of the video tape 11 to identify its location on the tape relative to the other frames 12. The frame identifying signals 23 include address information and timing information recorded, for example, as a pattern of magnetic flux transitions between different states of magnetization forming code elements representing code characters of a code. The pattern of flux transitions of each frame identifying signal 23 is unique and represents one of the code characters of a consecutive sequence of characters forming the code. Consecutive frames 12 of the tape 11 are identified by consecutive characters of the sequence forming the code. Hence, the number of frames 12 separating any two frames, e.g., 12' and 12'', of the tape 11 can be determined by examining the frame identifying signals 23. Since the length of a frame 12 is known, the distance or length of tape 11 separating any two frames can be determined from the frame identifying signals 23.

A code particularly suited for addressing video tapes used to record television program material is a time code in hours, minutes, seconds and frames with each of its characters expressed in binary notation as a binary coded decimal (BCD). Such an addressing scheme is described in the U.S. application, Ser. No. 870,680, filed Oct. 27, 1969, by John T. Heather, entitled "Recording Format For Data Recording And Reproducing Systems," and assigned to the assignee of this application. A video tape 11 used to record television signals in the NTSC field scanning standard has approximately 30 frames per second recorded along its video track 16. For a time code capacity of 24 hours, at least 26 code elements or bits are required to record eac frame identifying signal; two binary bits are required to express tens of hours, four bits for units of hours, three bits for tens of minutes, four bits for units of minutes, three bits for tens of seconds, four bits for units of seconds, two bits for tens of frames, and four bits for units of frames.

In the various field scanning standards, either 25 or about 30 frames are generated per second. To facilitate the construction of the transport control system 10 capable of controlling the advance of video tapes for recording information in different field scanning standards, 26 bits also would be used to time code a video tape for recording television signals in a standard, e.g., PAL, based upon 25 frames per second. However, since a different number of frames would represent one second, any arithmetic unit arranged to process the frame identifying signals from a tape employed to record television signals in a 30 frame per second field scanning standard would have to be modified to process frame identifying signals from a 25 frame per second tape.

To position the particular frame 12' at the desired location 13, the tape 11 is moved in a high speed shuttle mode between a supply reel 24 and a take-up reel 26 associated with the standard tape transport mechanism 14. Transport mechanisms suitable for positioning the particular frame 12' in accordance with the present invention are described in the manuals "VR-2000 Videotape Television Recorder," Vols. I and II, published by Ampex Corporation, 1965, and "VR-1000C Videotape Television Recorder," Vols. I and II, published by Ampex Corporation, 1962. In the illustrated embodiment, the tape 11 is moved between the reels 24 and 26 under the control of two reel motors 27 and 28 associated with the supply reel 24 and take-up reel 26, respectively. As widely used in video tape transport mechanisms, th reel motors 27 and 28 are powered by drive signals provided by a motor drive amplifier system 29. The motor drive amplifier system 29 provides forward or reverse drive signals depending upon the direction the tape 11 must be advanced to position its particular frame 12' at the desired location 13 and the speed it is desired to advance the tape 11. If the tape 11 is being advanced in the forward direction, for example, as represented by arrow 32, the motor drive amplifier system 29 issues drive signals to the take-up reel motor 28 to increase the speed of the tape advance. To decrease the speed of the tape advance, drive signals are issued to the supply reel motor 27. If the tape 11 is being advanced in the reverse direction, drive signals are issued to the supply reel motor 27 to increase the speed of tape advance and the drive signals are issued to the take-up reel motor 28 to decrease the speed of tape advance. The operation of the motor drive amplifier system 29 will be described in further detail hereinbelow with reference to the embodiment illustrated in FIG. 6.

To control the positioning of the particular frame 12', a magnetic head 31 is positioned to reproduce the frame identifying signals 23 recorded along the cue track 21 as the tape 11 is advanced, for example, in the forward direction as represented by arrow 32. The reproduced frame identifying signals 23 are coupled to an address decoder 33, for example, of the type described in the aforementioned United States application, Ser. No. 870,680. The address decoder 33 decodes the reproduced frame idnetifying signals 23 to provide the address signal and timing or clock signal forming each. The reproduced address signals are coupled to one input of an arithmetic unit 34 set to process binary signals arranged in the form of the particular time code of the address signals. An arithmetic unit suitable for processing the binary address signals in accordance with the present invention is described in the catalog "MSI Pocket Guide," pages 57–58, published by Fairchild Camera & Instrument Corporation, January 1970. A selector switch 36 is provided to set the arithmetic unit 34 to operate on address signals identifying frames 12 of television signals in either a 25 frames per second or a 30 frames per second field scanning standard. With the selector arm 37 of the switch 36 engaging the "30 Frame" contact, th logic elements forming the arithmetic unit 34 are enabled to operate on address signals identifying frames of television signals in a 30 frame field scanning standard. The logic elements are enabled to operate on address signals identifying frames of television signals in a 25 frame field scanning standard when the arm 37 engages the other "25 Frame" contact.

A second input 38 of the arithmetic unit 34 receives the address signal of the particular frame 12' to be positioned at the desired location 13 or magnetic head 31. The address signal of the particular frame 12' is input by the operator or some automatic means such as a program unit. The arithmetic unit 34 compares this address signal with each of the address signals reproduced from the tape 11 by the magnetic head 31 to provide a binary difference signal in number of frames which changes as the tape 11 is advanced to position the particular frame 12'. The difference number of frames is expressed in the time code and indicates the number of frames 12 separating the input address signal and the reproduced address signal. Since the length of each of the frames 12 of a tape is the same, the difference number of frames represents the length of tape 11 that must be advanced to position the particular frame 12' at the magnetic head 31.

In addition to the magnitude of the difference between input address signals, the arithmetic unit 34 also provides a D. C. voltage level signal indicative of whether the address signal of the particular frame 12' is greater than or less than the compared address signal reproduced from the tape 11. For example, a high voltage level signal could be arranged to be indicative of the particular frame address signal being greater while a low voltage level signal indicative of it being less than the reproduced address signal.

This allows transport control to be exercised regardless of the direction the tape 11 is advanced. For example, ordinarily, the frames 12 of the video tape 11 are consecutively addressed with the frames closer to the beginning of the tape having smaller addresses. Hence, if the tape 11 is advanced in a direction towards its end having smaller addresses, the address signal of the particular frame 12' input to the arithmetic unit 34 at its second input 38 will be smaller than the address signals reproduced from the tape 11. Because of the D. C. voltage level signal, the binary difference signal provided by the arithmetic unit 34 can be employed to control the advance of the tape 11 regardless of the direction the tape 11 is being advanced to position a particular frame at the location 13 of the magnetic head 31.

Besides using an arithmetic unit which is able to perform arithmetic operations on address data reproduced from the tape 11 as it is advanced in both the forward and reverse directions, the motor drive amplifier system 29 must be conditioned to provide a drive signal corresponding to the direction it is desired to advance the tape 11. The D. C. voltage level signal provided by the arithmetic unit 34 is used for this purpose. The D. C. signal is coupled to the motor drive amplifier system 29 by conductor 35 to condition it to issue the proper direction motor drive signals.

The difference number of frames represented by the difference signal provided by the arithmetic unit 34 is coupled to control the drive signals issued to the reel drive motors 27 and 28 by the amplifier system 29. In accordance with the present invention, the drive signals are generated by comparing a speed representative signal recorded on the tape 11 with a reference signal. If the tape speed is other than that corresponding to the proper relationship of the speed representative signal and reference signal, an appropriate corrective speed command is issued to cause one of the reel drive motors 27 or 28 to increase or decrease the tape speed accordingly. In the illustrated embodiment, the clock signals provided from the reproduced frame identifying signals 23 by the address decoder 33 are employed as the speed representative signal for comparison with the reference signal. The clock signals provided by the decoder 33 are in the form of a train of pulses whose repetition rate or frequency is a function of the recorded clock rate and therefore, the tape speed at which the frame identifying signals 23 are reproduced. The reference signal also is a train of pulses provided by a reference signal source 39 at a selected pulse repetition rate or frequency. As the tape 11 is accelerated or decelerated to position its particular frame 12' at the location 13 of the magnetic head 31, the train of reference pulses and a train of speed representative signals derived from the clock signals are coupled to the inputs of a comparator 41. Preferably, a common digital phase comparator is employed. of the type described in the manual "Inter-Sync* Model 1021 Solid State Television Synchronizer Operation And Maintenance Manual," published by Ampex Corporation, 1965. In systems employing such comparators, the phases of the reference pulse train and the speed representative pulse train are examined and if the frequencies of the pulse trains are equal and spaced 180° in phase a symmetrical square wave is issued. The symmetrical square wave is coupled to the motor drive amplifier system 29 which responsively issues drive signals to the reel motors 27 and 28 so that each is driven for one-half of the time. This maintains the speed of the advance of the tape 11 at that corresponding to the frequency of the reference pulse train. However, if the speed of the tape 11, hence, the frequency of the speed representative signal, is different than that corresponding to the frequency of the reference pulse train, the comparator 41 issues a constant voltage level signal. Depending upon whether the frequency of the speed representative signal is greater or less than that of the reference signal, the comparator 41 issues a high or low level voltage speed corrective signal. The corrective signal issued by the comparator 41 is employed to command the motor drive amplifier system 29 to generate the corresponding drive signals for application to the reel drive motors 27 and 28. For example, if the tape 11 is advanced in the forward direction to position its particular frame 12' and the tape speed is too slow, i.e., the frequency of the reference pulse train signal is higher than that of the train of speed representative pulses derived from the clock signal, the amplifier system 29 drives the take-up reel drive motor 28 while removing the drive from the supply reel drive motor 27 in response to a high voltage level signal issued by the comparator 41. If the tape speed is too high, i.e., the frequency of the reference signal is lower than that of the speed representative signal, the comparator 41 provides a low voltage level signal. The amplifier system 29 responsively removes the drive provided to the take-up reel by motor 28 while driving the supply reel drive motor 27. This causes a corrective decrease in the speed at which the tape 11 is advanced. Of course, if the tape 11 is transported in the reverse direction to position a particular one of its frames 12, the motor drive amplifier system 29 increases the speed of the tape 11 by increasing the drive of the supply reel drive motor 27 and decreases the speed by increasing the drive of the take-up reel drive motor 28.

To control the issuance of speed commands during the acceleration and deceleration of the tape 11, an address decoder, such as a priority bit selector 42, is coupled by a multiple conductor bus 43 to the arithmetic unit 34. The number of conductors forming the bus 43 is equal to number of code elements or bits forming a single address signal. In the specific embodiment described, 26 bits are used to address each of the frames 12. Each of the conductors of the bus 43 is connected to one of the 26 output gates included in the arithmetic unit 34. The signal level on the conductor provides an indication of the logic state of its associated gate. The priority bit selector 42 examines the signal level on the conductors of the bus 43 and outpus corresponding status signals when they represent certain ranges of binary difference numbers. The status signals determine the speed the transport mechanism 14 will be commanded to advance the tape 11. As the particular frame 12' is within different ranges of distances from the location 13, different status signals will be issued to cause the transport mechanism 14 to be commanded to advance the tape 11 at different speeds. As will be described in greater detail hereinbelow, the priority bit selector 42 is provided with selector switches 44 and 46 to change the ranges of binary difference numbers represented by the status signals output by the priority bit selector 42. Selector switch 44 enables the priority bit selector 42 to be set to operate with transport mechanisms having different deceleration characteristics. The selector switch 46 enables the priority bit selector 42 to be set to operate with tapes having frame identifying signals recorded thereon at different recording speeds. A priority bit selector suitable for being arranged to determine and provide an indication when the status signals represent certain ranges of binary difference numbers is described in the catalog "MSI Pocket Guide," pages 33–34, published by Fairchild Camera & Instrument Corporation, January 1970.

Figure 2:
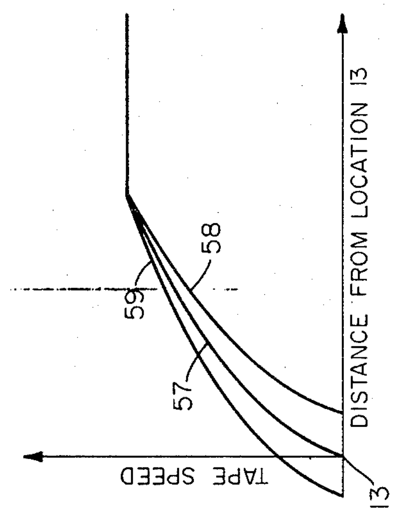
FIG. 2 is a graphical representation of the deceleration characteristic of a particular transport mechanism indicating the range over which it varies.

Each tape transport mechanism 14 has a certain nominal deceleration characteristic, for example, as represented by plot 57 in FIG. 2, largely determined by the system's inertia and drive motors 27 and 28. Because the system's inertia will change as, for example, the distribution of the tape 11 on the supply and take-up reels 24 and 26 changes, the actual deceleration characteristic will vary about the nominal value between a low and a high deceleration characteristic as represented by plots 58 and 59 of FIG. 2. Plots 57–59 illustrate the effect a change in the actual deceleration characteristic has on the length of tape required to be transported before coming to rest. As will be explained in more detail hereinbelow, to position the particular frame 12' at the selected location 13 in the shortest average time for all tape distributions on the reels 24 and 26, the speed command changes are selected according to the nominal deceleration characteristic so that, with an even distribution of the tape 11 on the reels 24 and 26, no more than one reversal of the direction of tape advance occurs. The speed command changes also are determined by the maximum possible speed the transport mechanism 14 is able to advance tape 11. Both, the maximum transport speed and the deceleration characteristic range can be determined empirically for any transport mechanism-recording medium combination. The maximum transport speed can be determined by increasing the drive to the prime mover, e.g., reel drive motor 28, until further increases do not result in corresponding increases in tape speed. The deceleration characteristic range can be determined by providing a drive signal to the prime mover, e.g., reel drive motor 27, while the recording medium is being advanced in the forward direction at the maximum speed to command the drive motor 27 to advance the record medium in the reverse direction and observing the time required for the recording medium to decelerate and come to rest. For tape record media, the deceleration characteristic range is determined by repeating this deceleration for different tape distributions on the reels 24 and 26.

The priority bit selector 42 is set by the selector switches 44 and 46 to issue a set of status signals according to the tape speed at which the frame identifying signals 23 are recorded, the deceleration characteristic of the transport mechanism 14 and the maximum speed the transport mechanism 14 is able to advance the tape 11. With the selector switches set as shown in FIG. 1, the priority bit selector 42 is set to operate with a tape transport mechanism 14 having a nominal deceleration characteristic 57 of about 130 inches per second per second (130 in./sec.$^2$) and which is able to advance the video tape 11 at a maximum speed of about 400 inches per second (400 ips), and with a tape carrying frame identifying signals 23 recorded thereon at a speed of 15 ips.

The priority bit selector 42 shown in the embodiment of FIG. 1 provides ten status signals at its output lines 47–56, inclusive. Each status signal represents a different range of the distances represented by the binary difference signals provided by the arithmetic unit 34. As the particular frame 12' is advanced towards the location 13 of the magnetic head 31, the number of frames 12 separating it from the magnetic head 31, changes, hence, the binary difference signal of the arithmetic unit 24 also changes. As the particular frame 12' is advanced closer to the magnetic head 31, the binary difference signal changes to represent smaller distances. Thus the priority bit selector 42 responds to certain combinations of signal levels on the conductors of bus 43 to activate different ones of its status lines 47–56. Table I below indicates the status lines activated by the priority bit selector 42 for a particular set of different ranges of numbers of frames 12 separating the particular frame 12' from the magnetic head 31 as represented by the binary difference signals of the arithmetic unit 34. In the specific embodiment, the frame identifying signals 23 are recorded at 15 ips on a video tape 11 intended for recording television signals in a 30 frame per second field scanning standard. Hence, the length of the frames 12 in the longitudinal direction of the tape 11 is one-half inch. Therefore, each reproduced frame identifying signal represents advancing the tape 11 one-half inch.

TABLE I

| Binary Difference No., N (Time Code) | Distance, D (Inches) | Active Status Line No. | Divisor |
|---|---|---|---|
| N ≥ 40 S | D ≥ 600 | 47 | |
| 40 S > N ≥ 20 S | 600 > D ≥ 300 | 48 | 94 |
| 20 S > N ≥ 10 S | 300 > D ≥ 150 | 49 | 64 |
| 10 S > N ≥ 4 S | 150 > D ≥ 60 | 50 | 42 |
| 4 S > N ≥ 1 S | 60 > D ≥ 15 | 51 | 21 |
| 1 S > N ≥ 10 F | 15 > D ≥ 5 | 52 | 12 |
| 10 F > N ≥ 4 F | 5 > D ≥ 2 | 53 | 7 |
| 4 F > N ≥ 2 F | 2 > D ≥ 1 | 54 | 5 |
| 2 F > N ≥ 1 F | 1 > D ≥ ½ | 55 | 3 |
| N < 1 F | D < ½ | 56 | 2 |

The symbols "S" and "F" used in Table I represent "seconds" and "frames," respectively.

The status lines 47–56 are connected to appropriate control circuitry 61 to effect a change in the frequency of one of the pulse trains forming the reference signal or clock signal coupled to the input of the phase comparator 41 according to the distance representative signal or binary difference signal of the arithmetic unit 34. When the particular frame 12' is one of the predermined distances, D, listed in Table I from the location 13 of the magnetic head 31, the priority bit selector 42 activates one of its status lines 47–56 to change the frequency. A change in one of these frequencies causes the speed command issued to the reel drive motors 27 and 28 to be changed accordingly. Preferably, these predetermined distances, D, and associated frequency changes are selected to accelerate and decelerate the tape 11 according to the deceleration characteristic of the transport mechanism 14 while the tape 11 is advanced at or close to the highest possible average speed to position the particular frame 12'.

To maintain the resolution of the transport controller 10 over the entire range of speeds at which the tape 11 is advanced, the speed command changes are effected by changing the frequency of the pulse train forming the clock signal while, preferably, maintaining the reference signal's frequency constant. As the particular frame 12' is advanced closer to the loaction 13, the frequency of the pulse train obtained from the clock signal and coupled to the comparator 41 is increased as the particular frame 12' passes each lower limit distance, D, of each of the indicated ranges of distances. By increasing the frequency of this pulse train each time the particular frame 12' passes one of these distances, D, the comparator 41 issues a corrective signal to the motor drive amplifier system 29 to command one of the reel motors 27 or 28 to slow the advance of the tape 11 to a speed corresponding to a clock signal frequency which, as coupled to the comparator 41, equals the reference signal frequency. As discussed hereinbefore, depending upon the relationship of the recorded clock signal frequency and reference signal frequency, this frequency increase can be accomplished by either frequency multiplication, division or a combination of both. However, for a high resolution transport controller 10 with minimum error, it is preferred to provide a high recorded clock signal frequency and to divide its frequency for comparing with the reference signal frequency.

Changes in the speed command coupled to the motor drive amplifier system 29 also can be effected by decreasing the frequency of the reference signal as the particular frame 12' is advanced closer to the location 13. However, the resolution of the transport controller 10 will be poorer at low speeds since a fewer number of reference and clock signal derived pulses will be coupled to the comparator 41 per unit time.

Referring to the control circuitry 61 of FIG. 1 in detail, the clock signal provided by the address decoder 33 is coupled to the input terminal 62 of an adjustable frequency divider 63. The adjustable frequency divider 63 also is coupled by control logic 64 which is responsive to the status of the output lines 47–56 of the priority bit selector 42 to set the divider to divide the clock signal frequency by one of a set of distance, D, related numbers. To facilitate adjusting the frequency divisor and minimize the number of components required to construct the adjustable frequency divider 63, a setable binary counter 66 is coupled to receive the clock signal pulse train at its clock input terminal 62 and provide an output pulse at its output terminal 67 each time its count reaches the capacity of the counter. By presetting different counts in the counter 66, the pulse frequency of the clock signal can be divided by different divisors to provide a divided clock signal frequency. For example, if a count is not preset in the counter 66, a pulse is issued at the counter output terminal 67 each time the counter counts a number of clock signal pulses corresponding to its capacity. Hence, the clock signal pulse frequency is divided by a number equal to the capacity of the counter 66. If a count equal to one-fourth the counter capacity is preset in the counter 66, a pulse is issued each time the counter counts a number of clock signal pulses corresponding to three-fourths of its capacity. Thus, the clock signal pulse frequency is divided by a number equal to three-fourths the capacity of the counter 66.

In the particular embodiment illustrated, a scale-of-seven counter 66 having a capacity of 128 is chosen. The counter scale is chosen according to the deceleration characteristic and the terminal velocity of the transport mechanism 14, the desired reproduced clock signal frequency when the tape 11 is being advanced at the maximum speed, the frequency of the reference signal relative to that of the recorded clock signal, and the number and size of speed change increments desired. With a given transport mechanism 14, resolution is enhanced if the recorded clock signal frequency is much higher than reference signal frequency. Furthermore, the greater the number of speed change increments and the smaller the size of the increments, the closer the actual average speed of the advance of the tape 11 approaches the theoretical highest average speed when accelerating and decelerating the tape 11. To enhance the resolution and achieve a higher average speed of advance requires a counter having a larger counter scale and that is able to divide the clock signal by a larger number of different divisors. This will become more apparent from the description below with reference to FIG. 3.

To preset predetermined counts in the counter 66, the control logic 64 includes a plurality of AND gates 68–74, inclusive, one of which is associated with each of the binary stages of the counter 66, i.e., 1, 2, 4, 8, 16, 32, and 64. Each of the AND gates 68–74 has two inputs; one of the inputs of all the AND gates are commonly coupled to a bus line 76, and the other of their inputs are separately coupled to the output of one of the OR gates 77–83 forming a divisor selector means 84. The bus line 76 is coupled to the output of a monostable multivibrator 86. Each time the counter 66 reaches capacity or a count state correspoinding to 128, the monostable multivibrator 86 receives a pulse from the counter's output terminal 67. The monostable multivibrator 86 responsively conditions the pulse for application to one input of the phase comparator 41 via the bus line 76. When the bus line 76 receives the conditioned pulse, the AND gates 68–74 are set to allow a count to be preset in the counter 66 in accordance with the states of the Or gates 77–83. Hence, while the particular frame 12′ is separated from the location 13 by distances, D, lying within any one of the ranges indicated in Table I, the monostable multivibrator 86 will preset the same count in the counter 66 each time the counter reaches its capacity. Thus, the adjustable frequency divider 63 issues a pulse for each $n_o^{th}$ reproduced clock signal pulse received at the input terminal 62 of the divider 63, where $n_o$ is the divisor set into the divider 63.

As the particular frame 12′ is advanced towards the location 13, the comparator 41 responds to the divided clock signal frequency and reference signal frequency to issue speed commands to slow the speed of the tape 11. This causes the reproduced clock signal frequency, hence, the divided clock signal frequency issued by the monostable multivibrator 86 to decrease. When the speed of the tape is reduced to that productive of a divided clock signal frequency equal to the reference signal frequency, the comparator 41 issues speed commands to maintain the tape 11 at this speed until the particular frame 12′ reaches a distance, D, lying within another range of lower distances. As will be described in further detail hereinbelow, this changes the states of the OR gates 77–83 forming the divisor selector means 84 whereby the count preset in the counter 66 by operation of the monostable multivibrator 86 will be different. With a different count preset in the counter 66, a different number of reproduced clock signal pulses is required to advance the count in the counter to its capacity state. Hence, the monostable multivibrator 86 will preset the counter 66 and issue a pulse to the comparator 41 for each $n_1^{th}$ reproduced clock signal pulse received by the divider 63, where $n_1$ is the new divisor set into the divider 63. The counter 66, multivibrator 86, divisor selector means 84 and comparator 41 continue to cofunction in this manner to cause speed commands to be issued to control the advance of the tape 11 until its particular frame 12′ is positioned at the location 13 at which time the transport of the tape 11 is stopped.

Considering the operation of the adjustable divider 63 in detail, when the binary difference signal in the arithmetic unit 34 indicates the particular frame 12′ is a distance, D, less than one frame or one-half inch from the location 13, status line 56 is activated by the priority bit selector 42. For a reference signal frequency of 450 Hz and a recorded clock pulse frequency of 2.25 KHz, the status line 56 is coupled to condition the OR gates 78–83 to preset a count of 126 into the counter 66. This corresponds to a divisor of two since a pulse will be output by the counter 66 for every second clock pulse input to the counter. Since the OR gates 72–74 are conditioned together to establish most of the divisors, i.e., when status lines 52–56 are activated, a common OR gate 87 and inverting amplifier 88 are coupled to commonly coupled inputs of the OR gates 81–83. The common OR gate 87 has an input coupled to each of the status lines 52–56 whereby the OR gates 81–83 are conditioned to preset their associated binary stage of the counter 66 when the status lines 52–56 are activated by the priority bit selector 42.

When the binary difference signal in the arithmetic unit 34 indicates the particular frame 12′ is a distance from the location 13 in the range equal to one-half inch to less than 1 inch, status line 55 is activated. Second inputs of OR gates 79, 80 and 87 and a first input of OR gate 77 are connected to this status line 55. Hence, the OR gates 77 and 79–83 are conditioned to preset a count of 125 into the counter 66, which count corresponds to a divisor of three.

Third inputs to OR gates 80 and 87, and second inputs to OR gates 77 and 78 are connected to the status line 54 whereby OR gates 77, 78 and 80–83 are conditioned to preset a count 123 in counter 66 when the arithmetic unit 34 has a binary difference signal therein indicative of the particular frame 12′ being a distance from the location 13 in the range equal to 1 inch to less than 2 inches. This count corresponds to a divisor of five.

The status line 53 is connected to a fourth input of the OR gates 80 and 87, and the third input of the OR gate 77. The status line 53 conditions OR gates 77 and 80–83 to preset a count of 121 in counter 66 when the binary difference signal in the arithmetic unit 34 indicates the particular frame 12′ is a distance from the location 13 in the range equal to 2 inches to less than 5 inches. This count corresponds to a divisor of seven.

The fifth input of OR gate 87 and the third input of OR gate 79 are connected to the status line 52 whereby OR gates 79 and 81–83 are conditioned to preset a count of 116 in the counter 66 when the binary difference signal in the arithmetic unit 34 indicates the particular frame 12′ is a distance from the location 13 in the range equal to 5 inches to less than 15 inches. This count corresponds to a divisor of 12.

The status line 51 is connected to the second inputs of OR gates 82 and 83, the fifth input of OR gate 80, the third input of OR gate 78 and the fourth input of OR gate 77. These OR gates are conditioned by the active state of status line 51 to preset a count of 107 in counter 66 when the binary difference signal in the arithmetic unit 34 indicates the particular frame 12′ is a distance from the location 13 in the range equal to 15 inches to less than 60 inches. This count corresponds to a divisor of21.

The third input of OR gate 83, the second input of OR gate 81, and the fourth inputs of OR gates 78 and 79 are connected to the status line 50 whereby they are conditioned to preset a count of 86 in the counter 66 when the binary difference signal in the arithmetic unit 34 indicates the particular frame 12′ is a distance from the location 13 in the range equal to 60 inches to less than 150 inches. This count corresponds to a divisor of 42.

The status line 49 is connected to a fourth input of the OR gate 83 to condition it to preset a count of 64 in the counter 66 when the binary difference signal in the arithmetic unit 34 indicates the particular frame 12' is a distance from the location 13 in the range equal to 150 inches to less than 300 inches. This count corresponds to a divisor of 64.

The third input of OR gate 82 and the fifth input of OR gate 78 are connected to the status line 48 whereby they are conditioned to preset a count of 34 in the counter 66 when the binary difference signal in the arithmetic unit 34 indicates the particular frame 12' is a distance from the location 13 in the range equal to 300 inches to less than 600 inches. This count corresponds to a divisor of 94.

When the particular frame 12' is a distance equal to or greater than 600 inches from the location 13 of the magnetic head 31, the binary difference signal in the arithmetic unit 34 causes the priority bit selector 42 to activate its output line 47. This status line 47 is connected to the digital phase comparator 41 to set and lock it in a state which is productive of the generation of a corrective signal corresponding to a maximum speed command. Hence, the transport mechanism 14 will be commanded to advance the tape 11 at the maximum speed or its terminal velocity regardless of the frequency of the reference and clock signal derived pulse trains when the particular frame 12' is distance from the location 13 equal to or greater than 600 inches.

Figure 4:
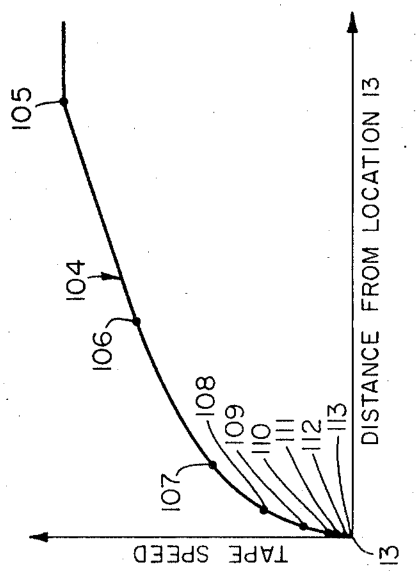
FIG. 4 is a graphical representation of the trajectory followed by a particular storage location of a record medium as it is decelerated by the transport mechanism having the deceleration characteristic of FIG. 2.
Figure 5:
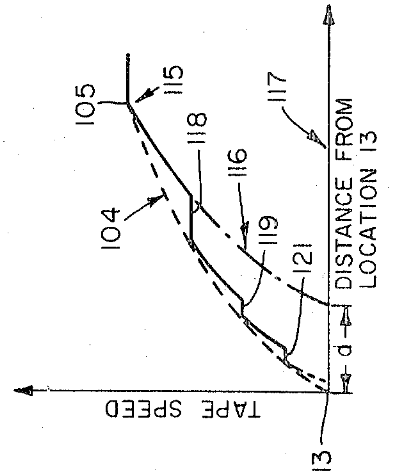
FIG. 5 is a graphical representation of the trajectory followed by a particular storage location of a record medium as it is decelerated by the transport mechanism having the deceleration characteristic of FIG. 2.
Figure 3:
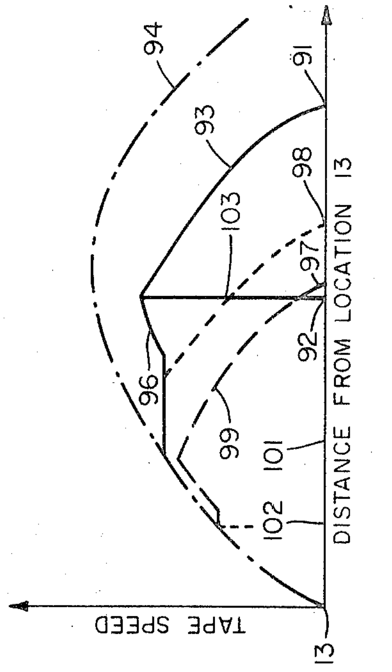
FIG. 3 is a graphical representation of various trajectories followed by a particular storage location of a record medium transported by the transport mechanism having the deceleration characteristic of FIG. 2.

The manner in which the transport controller 10 operates in accordance with the present invention to control the position of the particular frame 12' of the tape 11 can be better understood by considering its operation with reference to the trajectory curves of the particular frame 12' depicted by the graphs of FIGS. 3, 4 and 5.

To position the particular frame 12' at the location 13 of the magnetic head 31, its address signal is input to the arithmetic unit 34 at its input terminal 38. The advance of tape 11 is initiated by an enabling start command input at terminal 89 of amplifier system 29. Since the particular frame 12' is depicted as being initially positioned at a distance point 91 greater than the 600 inches (i.e., distance point 92) from the location 13, the arithmetic unit 34 will provide a binary difference signal greater than one corresponding to 600 inches. Hence, the priority bit selector 42 places an active status signal on its output line 47. As long as the difference signal corresponds to a distance greater than or equal to 600 inches the status line 47 is activated. Thus, the comparator 41 responsively provides a speed command to the amplifier system 29 which causes the appropriate one of the reel drive motors 27 and 28 to advance the tape 11 at the maximum speed of 400 ips. If the tape 11 is advanced in the forward direction to position its particular frame 12', the amplifier system 29 issues drive signals causing the take-up reel drive motor 28 to advance the tape 11 at the maximum speed. The supply reel drive motor 27 is caused to advance the tape 11 at the maximum speed by drive signals issued by the amplifier system 29 when the tape 11 is advanced in the reverse direction to position the particular frame 12'. To reach the maximum speed, the tape 11 is accelerated according to the deceleration characteristic of the transport mechanism 14 whereby the particular frame 12' follows a parabolic speed trajectory as represented by the solid line portion 93 of the plot of FIG. 3.

If the particular frame 12' is initially located a sufficient distance from the location 13, for example, more than 1,200 inches, the tape 11 will attain the maximum speed before the particular frame 12' reaches the 600 inches point 92. While the comparator 41 provides speed commands to increase the drive of one of the motors 27 and 28, hence, the tape speed, after the maximum speed has been attained, the speed is not increased further because the transport mechanism 14 will have reached its terminal velocity. However, this operation of the transport controller 10 assures the maintenance of the tape speed at maximum until the particular frame 12' reaches a distance from the location 13 at which deceleration must be initiated, i.e., distance point 92. The trajectory of the particular frame 12' under these circumstances is represented by the plot 94 of FIG. 3 formed by alternating short and long dashes.

However, the particular frame 12' may be initially located an insufficient distance from the location 13 to allow the tape speed to reach maximum before the particular frame 12' passes the distance point 92. In such cases, the priority bit selector 42 responds to the difference signal in the arithmetic unit 34 corresponding to 600 inches to activate its status line 48. This sets the adjustable divider 63 to divide the reproduced clock signal frequency by 94. If the tape speed is such that divided clock signal frequency is greater than reference signal frequency when the particular frame 12' passes the distance point 92, the comparator 41 provides a speed corrective signal to command the reel drive motors to reduce the speed of the tape 11. By issuing this corrective speed command, the drive is removed from the motor advancing the tape 11 and is applied to the other motor whereby the tape 11 decelerates until the divided clock signal frequency equals the reference signal frequency. The particular frame 12' follows a trajectory represented by the solid line portion 96 of the plot of FIG. 3. When the speed of the tape 11 is reduced so that the divided clock signal frequency equals the reference signal frequency, the comparator 41 operates in the manner hereinbefore described to maintain the tape at that speed productive of divided clock and reference signals having the same frequency. This speed is maintained until the particular frame 12' is a distance from the location 13 at which the speed command is changed to command the reel motors to advance the tape 11 at a new lower speed.

However, the particular frame 12' may be initially located at a distance point, for example, 97 or 98, which does not allow the tape speed to be increased during the initial acceleration to one productive of a divided clock signal frequency greater than the reference signal frequency when the particular frame 12' passes the 600 inches distance point 92. In such cases, a large difference in the frequencies of the frequency divided clock signal and the reference signal exists and the comparator 41 continues to provide a corrective speed command which causes the reel motors to advance the tape 11 at the maximum speed. When the tape 11 is being transported in the forward direction, the reel motor 28 will receive a drive signal from the amplifier system 29 corresponding to this command until either these frequencies become equal or the divisor is changed to reduce the frequency of the frequency divided clock signal below that of the reference signal.

For example, if the particular frame 12' is initially located at distance point 97 to follow the trajectory represented by the plot 99 of FIG. 3 formed by long dashes, the tape 11 is accelerated by the appropriate reel motor until the particular frame 12' reaches a distance point 101 which is 300 inches from the location 13. As the particular frame 12' passes through the distance point 101, the priority bit selector 42 responds to the binary difference signal in the arithmetic unit 34 to remove the active status from its status line 48 and to activate its status line 49. This changes the divisor of the adjustable divider 63 to 64. Hence, the divided clock signal frequency will be greater than the frequency of the reference signal and the tape controller 10 will operate as discussed above with reference to the trajectory plots 93 and 96 until the particular frame 12' reaches another distance point 102. At this distance point 102, the speed command is changed to command the reel motors to advance the tape 11 at a new lower speed.

However, if the particular frame 12' is initially located at distance point 98 to follow the trajectory represented by the plot 103 of FIG. 3 formed by short dashes, the tape 11 is accelerated until its speed is productive of a reproduced clock signal frequency which, after being divided by the adjustable divider 63, equals the frequency of the reference signal. When these frequencies become equal, the comparator 41 operates in the manner described hereinbefore to maintain the tape 11 at this speed until the particular frame 12' passes the distance point 102.

In the most preferred form of the present invention, the divisor of the adjustable divider 63 is changed as the particular frame 12 reaches distances, D, from the location 13 whereby, in decelerating the tape 11 at a rate corresponding to the nominal deceleration characteristic, the speed at which the transport mechanism 14 is commanded to advance the tape 11 is slightly less than the actual speed of the tape 11 as its particular frame 12' passes each of the distances. Furthermore, the divisors and distances, D, are chosen so that the actual tape speed is reduced to slightly more than the commanded speed as the divisor of the divider 63 is changed to further reduce the tape speed. By so selecting and changing the divisors, the speed of the tape 11 will closely follow the deceleration characteristic during both tape acceleration and deceleration. Hence, as the tape 11 is advanced to position the particular frame 12' at the location 13, it will be transported at much higher average velocities since the acceleration and deceleration will be continuous once they are started. The plot 104 of FIG. 4 illustrates the trajectory of the particular frame 12' under these conditions as the tape 11 is decelerated from the maximum speed to position it at location 13. The points 105–113 indicate the tape speeds and particular frame distances, D, at which the divisor of the adjustable divider 63 is changed.

With the divisor of the adjustable divider 63 changed according to Table I as the particular frame 12' is advanced towards the location 13 and a transport mechanism 14 having a nominal deceleration characteristic of about 130 in./sec.$^2$, when the particular frame 12' is within 600 inches of location 13 and is being advanced at the transport mechanism's maximum speed of 400 ips, the frequency of the reproduced clock signal coupled to the input terminal 62 of the adjustable divider 63 is 60 KHz. As the particular frame 12' reaches a distance of under than 600 inches from the location 13, the priority bit selector 42 responds to the binary difference signal in the arithmetic unit 34 to activate the status line 48 and, thereby, to set the divider 63 to divide the frequency of the reproduced clock signal by 94. Since the active status is removed from the output line 47, the comparator is freed to operate normally. As long as one of the conductors of bus 43 associated with the output gates of the arithmetic unit 34 indicative of a binary difference signal in the range of 20 to less than 40 seconds (300 to less than 600 inches) is active, the priority bit selector 42 maintains active status of its output line 48. Initially, the divided clock signal frequency issued by the divider 63 equals about 640 Hz. Since this is much greater than the 450 Hz reference signal frequency, the normally operating comparator 41 issues speed commands which cause the amplifier system 29 to issue drive signals to the reel motors 27 and 28 to reduce the tape speed. As explained hereinbefore, this causes the transport mechanism 14 to decelerate the tape 11 according to its deceleration characteristic until the tape speed is reduced to that which is productive of a reproduced clock signal frequency of 42.3 KHz, which after being divided, is equal to 450 Hz, i.e., about 282 ips. If the tape speed is reduced to 282 ips, the comparator 41 maintains the tape speed until the distance, D, is reduced to 300 inches. However, with a transport mechanism 14 having a nominal deceleration characteristic illustrated in FIG. 4, the particular frame 12' arrives at a point 300 inches from the location 13 just before the tape speed reaches 282 ips.

Since the particular frame 12' is within three hundred inches of location 13, the binary difference signal in the arithmetic unit 34 causes the priority bit selector 42 to activate the status line 49 and, thereby, to set the divider 63 to divide the frequency of the reproduced clock signal by 64. Initially, the divided clock signal frequency issued by the divider 63 is increased from 450 Hz to about 660 Hz. Since this is greater than the 450 Hz reference signal frequency, the comparator 41 again issues a speed command which causes the amplifier system 29 to issue a drive signal to the reel motors to reduce the speed of the tape 11. This causes the transport mechanism 14 to decelerate the tape 11 according to its deceleration characteristic until the tape speed is reduced to that which is productive of a reproduced clock signal frequency which, after being divided, is equal to 450 Hz, i.e., 192 ips. The particular frame 12' arrives at a point 100 fifty inches from the location 13 just before the tape 11 reaches this speed. This is another divisor change point.

As the particular frame 12' is further advanced towards the location 13, the transport controller 10 continues to change the divisor of the adjustable divider 63 to increase the divided clock signal frequency as the particular frame 12' reaches the various other distances, D, indicated in Table I. Each time the divided clock signal is increased by a change in the divisor, the transport mechanism 14 is commanded to further decelerate the advance of the particular frame 12' until it is within one-half inch of the location 13. When the particular frame 12' is advanced to within one-half inch of the location 13, the tape speed is reduced to 9 ips. The binary difference signal in the arithmetic unit 34 causes the priority bit selector 42 to activate the status line 56 and, thereby, to set the divider 63 to divide the frequency of the reproduced clock signal by two. Initially, the divided clock signal frequency issued by the divider 63 is increased from 450 Hz to 675 Hz. As discussed hereinbefore, this increase in the divided clock signal frequency causes the transport mechanism 14 to decelerate the tape 11. When the particular frame 12' is within about one-tenth of an inch of the location 13, the speed of the tape 11 will be reduced to about 6 ips. At this tape speed, the frequency of the reproduced clock signal is 900 Hz and, hence, the divided clock signal frequency is 450 Hz, i.e., equal to the reference signal frequency. The comparator 41 operates to maintain this tape speed until the binary difference signal in the arithmetic unit 34 indicates a zero distance, D. When this occurs, the arithmetic unit 34 issues a signal which is coupled by line 114 to the motor drive amplifier system 29 to remove the drive signal from the reel motors advancing the tape 11. Because of the slow speed of the tape 11, the particular frame 12' will be stopped at the location 13.

In describing the operation of the transport controller 10 with reference to FIG. 4, it was assumed the deceleration characteristic of the transport mechanism 14 is such that, as the tape 11 is decelerated, its speed follows the plot 104 of the nominal deceleration characteristic. However, as explained hereinbefore, the actual deceleration characteristic of a transport mechanism 14 will vary about a nominal value, such as indicated by the plots 57–59 of FIG. 2. Plot 115 of FIG. 5 illustrates the speed of the tape 11 as it is decelerated when the deceleration characteristic of the transport mechanism 14 is greater than that represented by plot 104 of FIG. 4. The plot 104 is also shown in FIG. 5 as a series of long dashes.

If the tape 11 is allowed to decelerate under the control of only its transport mechanism's deceleration characteristic when the particular frame 12' reached the 600 inches distance point 105, the particular frame 12' would fall short of the location 13 by a distance, *d*, as shown by the portion 116 of the plot of FIG. 5 formed by alternating short and long dashes. If the deceleration of the tape 11 is begun when the particular frame 12' is at a distance point 117, the particular frame 12' will be advanced to the location 13. However, if plots 104 and 116 represent, respectively, the nominal and maximum deceleration characteristics of the transport mechanism 14, the particular frame 12' will overshoot the location 13 a majority of the time as the tape 11 is decelerated under the influence of the lower deceleration characteristics to position the particular frame 12'. This overshoot occurs because the speed of the tape 12 will be too high to be stopped when the particular frame 12' passes the location 13. While the transport controller 10 will reverse the advance of the tape 11 to position the particular frame 12' at the location 13 when an overshoot occurs, it is desirable to limit such overshoots to one in order to position the particular frame 12' at the location 13 in the shortest possible time. Therefore, it is preferred to select the distance point 105 at which the tape deceleration is started so the transport controller 10 controls the transport mechanism 14 to advance the tape 11 in one direction while positioning the particular frame 12' at location 13 when its deceleration characteristic is nominal or greater.

When the deceleration characteristic of the transport mechanism 14 is greater than nominal, the actual speed of the tape 11 will reach that productive of a divided clock signal frequency equal to the reference signal frequency before the particular frame 12' reaches a distance, D, from the location 13, at which the divisor of the adjustable divider 63 is changed. Hence, the speed of the tape 11 will be maintained constant by the operation of the comparator 41 for short intervals during its deceleration. Portions 118, 119 and 121 of the plot 115 of FIG. 5 show some of the constant tape speed intervals. The presence of these constant tape speed intervals during the deceleration of the tape 11 does reduce the actual average speed below the highest possible average speed at which the tape 11 could be advanced to position its particular frame 12'. However, the transport controller 10 optimizes the average speed at which the tape 11 is advanced, hence, the access of time for any particular frame 12', for all deceleration characteristic conditions of the transport mechanism 14. Furthermore, if the distance the particular frame 12' is advanced between divisor changes is decreased and the number of divisor changes increased, each of the intervals of constant tape speed can be shortened. Hence, the actual average tape speed can be increased to at least approach the highest possible average tape speed for all deceleration characteristic conditions of the transport mechanism 14.

As mentioned hereinbefore, if the particular frame 12' is advanced beyond or overshoots the location 13, the transport controller 10 is able to reverse the direction of the tape advance. When the particular frame 12' overshoots the location 13, the reproduced address signals received by the arithmetic unit 34 from the decoder 33 will change from being smaller than the address signal of the particular frame 12' to being larger than that of frame 12' or vice versa depending upon the direction the tape is initially being advanced. Hence, the voltage level of the D. C. signal on the conductor 35 of the arithmetic unit 34 changes. This change in voltage level conditions the motor drive amplifier system 29 to issue drive signals to cause the tape 11 to be advanced in the opposite direction. If the initial overshoot is substantial, this change in the direction of the tape advance may occur several times before the particular frame 12' is positioned at the location 13.

Thus far, the specific embodiment of FIG. 1 has been described as arranged to position a tape 11 intended for recording television signals at a speed of 15 ips. However, if the transport controller 10 is to be employed to position a tape 11 intended for recording television signals at a different, for example, lower speed of 7.5 ips, the controller 10 must be modified to operate on reproduced address signals representing a different length of the tape 11. In a thirty frame per second field scanning standard, frames 12 recorded at 7.5 ips have a length of one-quarter inch or one-half that when recorded at 15 ips. Consequently, there are twice as many frames 12 per unit length of the tape 11. Furthermore, the frame identifying signals 23 also are recorded at 7.5 ips. Hence, each frame identifying signal represents a length of tape 11 which is one-half, i.e., one-quarter inch, of that when signals 23 are recorded at 15 ips.

Thus, to initiate the deceleration of the tape 11 when the particular frame 12' is 600 inches from the location 13, the priority bit selector 42 must activate its status line 48 when the difference signal in the arithmetic unit 34 represents twice as many frames 12 as that when controlling a tape 11 having frame identifying signals 23 recorded thereon at 15 ips. Selector switch 46 controls the priority bit selector 42 to activate its status lines 47–56 in response to different sets of binary difference signals in the arithmetic unit 34. As shown in FIG. 1, the selector switch 46 is positioned to cause the priority bit selector 42 to activate its status lines 47–56 according to the set of binary difference signals indicated in Table I. By switching the selector switch 46 to the other of its illustrated positions, the priority bit selector 42 is conditioned to respond to a new set of binary difference signals in the arithmetic unit 34 to activate its status lines 47–56. Preferably, each of the binary difference signals of the new set represents twice the number of frames 12 indicated in the time code column of Table I, i.e., $N \geq$ 1 minute 20 seconds instead of $N \geq$ 40 seconds, etc. In addition, the reference signal source 39 is adjusted to issue a reference signal pulse train at a new and higher frequency of 900 Hz. With these settings of the reference signal source 39 and the priority bit selector 42, a tape 11, with its frame identifying signals 23 recorded at 7.5 ips and transported by the transport mechanism 14 previously described, will be accelerated and decelerated as previously discussed with reference to FIGS. 3–5. Hence, even though twice as many frames 12 will be advanced past location 13 in positioning the particular frame 12', the particular frame 12' will follow the parabolic speed trajectories depicted in FIGS. 3–5.

Although the priority bit selector 42 is shown as being adjustable for only two different frame identifying signals per unit length of tape conditions, it may be arranged to be adjustable for any number of such conditions. For any particular transport mechanism having a certain deceleration characteristic and any selected reference signal frequency, the priority bit selector 42 can be conditioned to respond to a set of any desired binary difference signals provided by the arithmetic unit 34. By providing both an adjustable reference frequency source 39 and an adjustable priority bit selector 42, the transport controller 10 can be easily programmed to control transport mechanisms having different deceleration characteristics and to control tapes with frame identifying signals representing any one of several different unit lengths of the tape.

The particular reference signal source 39 illustrated in FIG. 1 includes a reference pulse generator 122 generating a pulse train at a frequency of 900 Hz. To obtain a 450 Hz reference signal frequency, the output of the generator 122 is coupled to a first AND gate 123. This AND gate is conditioned to pass the generated pulse train to a frequency divider 124 when the switch 126 is closed as shown. The divider 124 divides the frequency of the reference signal pulse train by two to obtain the 450 Hz reference signal. The output of the frequency divider 124 is coupled to the first input of an OR gate 127 which passes the reference signal to the input of the comparator 41.

To obtain a reference signal frequency of 900 Hz, the switch 126 is opened and a second switch 128 coupled to the input of an AND gate 129 is closed. This conditions the AND gate 129 to pass the 900 Hz reference signal directly to the second input of OR gate 127 for application to the comparator 41.

The priority bit selector 42 also can be conditioned to activate its status lines 47–56 to control the positioning of a tape 11 transported by different transport mechanisms 14, each having a different deceleration characteristic and/or a different terminal velocity. To decelerate the tape 11 as it is advanced in only one direction to position its particular frame 12' and, thereby, optimize the access time, the deceleration of the tape 11 is initiated at different distances, D, when the tape is being transported by transport mechanisms having either different deceleration characteristics or terminal velocities. Thus, the priority bit selector 42 must be conditioned to respond to a binary difference signal representative of at least a different distance, D, for activating its status line 48. Preferably, the priority bit selector 42 is conditioned to respond to binary difference signals representative of a new set of distances, D, indicating the separation of the particular frame 12' and location 13. This allows the operation of the transport controller to be tailored to a particular deceleration characteristic and/or terminal velocity, hence, setting it to control any transport mechanism 14 whereby the transported tape 11 is advanced at or close to the highest possible average speed when it is accelerated and decelerated to position its particular frame 12' at location 13.

To condition the priority bit selector 42 to operate with a transport mechanism 14 having a different nominal deceleration characteristic and terminal velocity, a second selector switch 44 is provided. The setting of the selector switch 44 determines the set of binary difference signals in the arithmetic unit 34, hence, the distances, D, separating the particular frame 12' from the location 13, which will cause the priority bit selector 42 to activate its status lines 47–56. With the selector switch 44 positioned as shown in FIG. 1, the binary difference signals indicated in Table I determine the activation of the status lines 47–56. However, if the transport controller 10 is employed to control the advance of the tape 11 being transported by another transport mechanism 14 having a different range of deceleration characteristics including a new nominal deceleration characteristic of, for example, 50 in./sec.$^2$, and new terminal velocity of 300 ips, the selector switch 44 is switched to its other position. With it in this position, the priority bit selector 42 is conditioned to activate its status lines 47–56 in accordance with the binary difference signals in the arithmetic unit 34 indicated in Table II below.

TABLE II

| Binary Difference No., N (Time Code) | Distance, D (Inches) | Active Status Line No. | Divisor |
|---|---|---|---|
| N ≥ M | D ≥ 900 | 47 | |
| 1 M > N ≥ 50 S | 900 > D ≥ 750 | 48 | 94 |
| 50 S > N ≥ 25 S | 750 > D ≥ 375 | 49 | 64 |
| 25 S > N ≥ 10 S | 375 > D ≥ 150 | 50 | 42 |
| 10 S > N ≥ 3 S | 150 > D ≥ 45 | 51 | 21 |
| 3 S > N ≥ 30 F | 45 > D ≥ 15 | 52 | 12 |
| 30 F > N ≥ 8 F | 15 > D ≥ 4 | 53 | 7 |
| 8 F > N ≥ 4 F | 4 > D ≥ 2 | 54 | 5 |
| 4 F > N ≥ 2 F | 2 > D ≥ 1 | 55 | 3 |
| N < 2 F | D < 1 | 56 | 2 |

The symbols "M," "S" and "F" used in Table II represent "minutes," "seconds" and "frames," respectively.

The priority bit selector 42 is shown as being adjustable to set the transport controller 10 to control transport mechanisms having either of two different deceleration characteristic and terminal velocity combinations. However, it will be appreciated that the selector switch 44 can be provided with additional switch positions so associated with the priority bit selector 42 to enable the priority bit selector 42 to be set for responding to different sets of binary difference signals in the arithmetic unit 34 whereby any number of different transport mechanisms having different deceleration characteristics and/or terminal velocities can be controlled.

When controlling a tape intended for use in recording television signals in a 25 frame field scanning standard, the length of tape 11 represented by each frame identifying signal 23 is longer than that represented by frame indentifying signals recorded along a tape intended for use in recording television signals in a 30 frame field scanning standard. If the same transport mechanism 14 is employed to transport magnetic tapes intended for recording television signals in both the 30 and 25 frame field scanning standards, it is possible to avoid having to condition the priority bit selector 42 to activate its status lines 47–56 in response to a different set of binary difference signals in the arithmetic unit 34 by reducing the reference signal frequency when controlling a 25 frame field scanning standard tape 11. However, if desired, the reference signal frequency could be maintained at 900 Hz and the priority bit selector 42 conditioned to be responsive to a different set of binary difference signals to accommodate the different frame identifying signal per unit length of tape relationship so that the advance of the tape 11 is controlled as described hereinbefore with reference to FIGS. 3–5.

For the transport mechanism 14 described hereinbefore having a nominal deceleration characteristic of 130 in./sec.$^2$, the reference pulse generator 122 is adjusted to reduce the reference signal frequency to 720 Hz by increasing the capacitance of the pulse generator. This is accomplished by closing the switch 131 to connect the capacitor 132 to the frequency determining circuit of the generator 122. If the transport controller 10 is operated to control the positioning of a tape having frame identifying signals recorded thereon at a recording speed of 15.625 ips, the reference frequency source 39 provides a 360 Hz reference signal to the comparator 41. With the arm 37 of the arithmetic unit's selector switch 36 engaging the "25 Frame" contact, the priority bit selector 42 conditioned to respond to the binary difference signals indicated in Table I and the reference signal source 39 providing a 360 Hz reference signal, the particular frame 12' being positioned will follow the parabolic speed trajectories as described hereinabove with reference to FIGS. 3–5. While distances, D, in inches of tape 11 at which the divisor of the adjustable divider 63 is changed are slightly greater, i.e., by about 4 percent, than those indicated in Table I, the average speed of the tape 11 during the positioning of the particular frame 12' still is at or close to the maximum.

Figure 6:
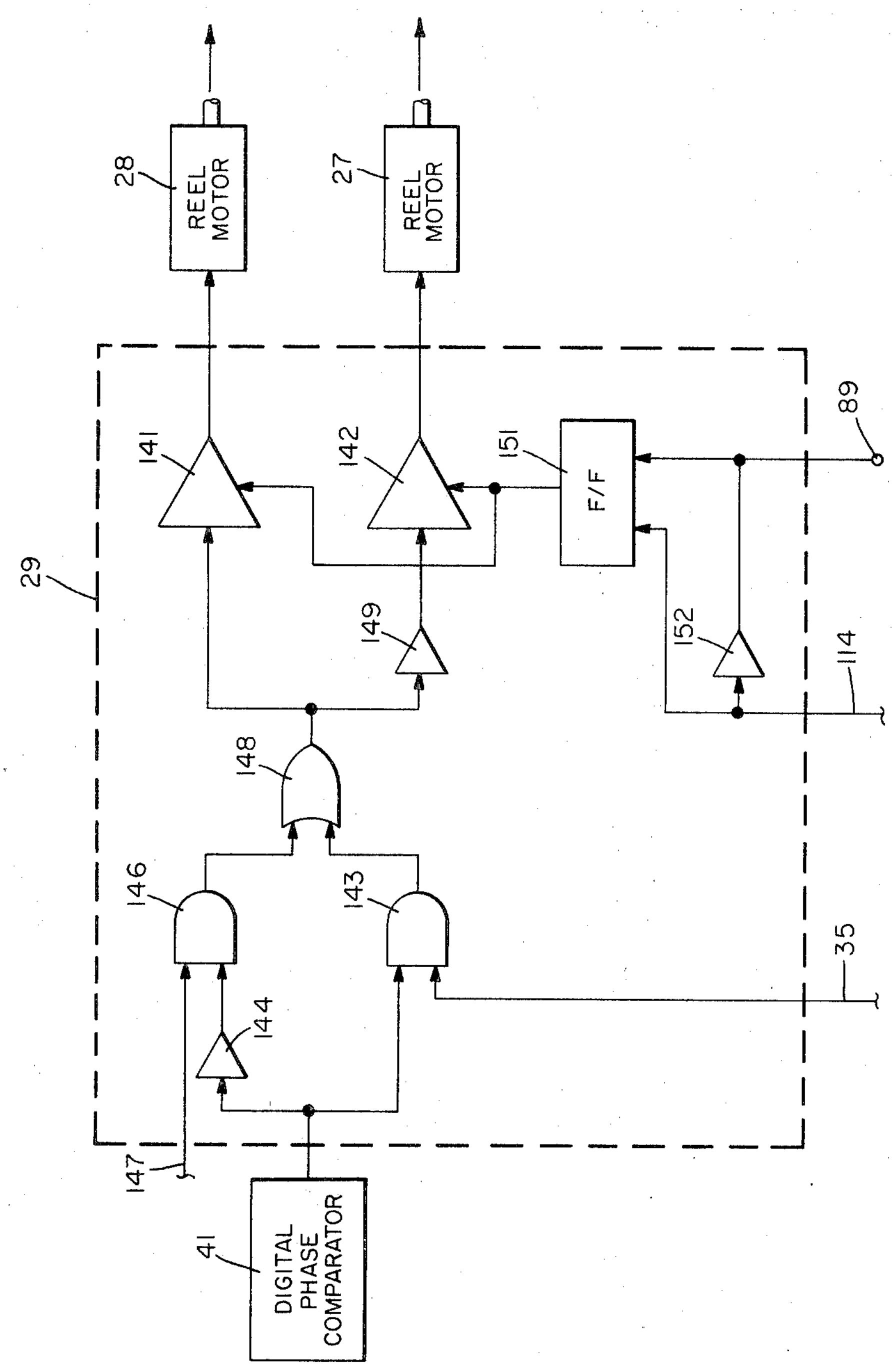
FIG. 6 is a detailed schematic block diagram of the motor drive amplifier system employed in the transport controller of FIG. 1.

Referring to FIG. 6, an embodiment of the motor drive amplifier system 29 for providing the proper drive signals to the reel drive motors 27 and 28 in accordance with direction the tape 11 must be advanced to position a particular one of its frames 12 at the location 13 is illustrated. As previously described, two reel drive motors 27 and 28 are employed to control the advance of tape 11. Take-up reel drive motor 28 is driven to increase the tape speed whenever the tape 11 must be transported in the forward direction depicted by arrow 32 and it is being transported either in the reverse direction or at too low of a speed in the forward direction as determined by the frequencies of the reference signal and divided clock signal. Furthermore, the take-up reel drive motor 28 is driven to slow the tape speed whenever the tape 11 must be transported in the reverse direction or it is being transported in the forward direction at too high of a speed. The supply reel drive motor 27 is driven by the amplifier system 29 at all other times, i.e., to increase the tape speed when the tape 11 is being advanced in the reverse direction at too low of a speed or being advanced in the forward direction when it should be advanced in the reverse direction, and to decrease the tape speed when the tape 11 is being advanced in the forward direction at too high of a speed.

The gating circuit of FIG. 6 examines the direction the tape 11 is being advanced, the direction the tape 11 must be advanced to position a particular one of its frames 12 at the location 13 and the tape speed, and responsively activates either the forward motor drive amplifier 141 or the reverse motor drive amplifier 142 to cause the associated reel motor 28 or 27 to control the advance of the tape 11. More particularly, the output of the digital phase comparator 41 is coupled directly to one input of a first AND gate 143 and through an inverting amplifier 144 to one input of a second AND gate 146. A second input of the second AND gate 146 is coupled via conductor 147 to the address decoder 33 to receive a voltage level signal indicative of the direction the tape 11 is being advanced. With the motor drive amplifier system 29 of FIG. 6, a low voltage level signal from the address decoder 33 indicates the tape 11 being advanced in the forward direction while a high voltage level indicates it is being advanced in the reverse direction. The second input of the first AND gate 143 is coupled to conductor 35. The D. C. voltage level on the conductor 35 indicates the direction the tape 11 must be advanced to position its particular frame 12' at the location 13. A high voltage level is required by the amplifier system 29 to indicate the forward direction and a low voltage level the reverse direction.

Each of the AND gates 143 and 146 is energized by coincident high voltage level inputs to provide an output which activates the forward motor drive amplifier 141. The first AND gate 143 is energized by coincident high voltage level inputs whenever the tape 11 must be advanced in the forward direction to position its particular frame 12' at location 13 (high voltage level on conductor 35) and it is being advanced at too slow of a speed (a high voltage level signal provided by the digital phase comparator 41). This condition occurs whenever the address signal of the particular frame 12' input to the arithmetic unit 34 at its second input 38 is greater than the reproduced address signals received from the address decoder 33 and the frequency of the reference signal provided to the digital phase comparator 41 by the reference signal source 39 is less than the frequency of the divided clock signal issued by the adjustable frequency divider 63. It should be appreciated that this condition can occur regardless of the direction the tape 11 is being advanced. If the tape 11 is being advanced in the proper forward direction, the output of the energized AND gate 143 activates the forward motor drive amplifier 141 to increase the tape speed. However, if the tape 11 is being advanced in the improper reverse direction, the output of the energized AND gate 143 activates the forward motor drive amplifier 141 to reverse the advance of the tape 11 to the proper desired direction.

The second AND gate 146 is energized by coincident high voltage level inputs whenever the tape 11 is being advanced in the reverse direction (high voltage level on conductor 147) at too high of a tape speed (a low voltage level signal provided by the digital phase comparator 41 and inverted by the inverting amplifier 144). This condition occurs when the tape 11 is being advanced in the proper reverse direction at too high of a speed. It should be appreciated that the condition can occur regardless of the direction the tape 11 must be advanced to position its particular frame 12' at the location 13. If the tape 11 is being advanced in the proper reverse direction, the output of the energized AND gate 146 activates the forward motor drive amplifier 141 to decrease the tape speed. However, if the tape 11 is being advanced in the improper reverse direction, the output of the energized AND gate 146 activates the forward motor drive amplifier 141 to reverse the advance of the tape 11 to the proper desired direction.

For all other conditions, neither of the AND gates 143 and 146 are energized. As will be explained hereinbelow, when neither of the AND gates 143 or 146 are energized, the reverse motor drive amplifier 142 is activated to apply a drive signal to the supply reel motor 27. The supply reel motor 27 is driven either to slow the speed of the tape 11 when it is being advanced too fast in the proper reverse direction or to reverse the direction of the tape advance when the tape 11 is being transported in improper forward direction. The output of each of the AND gates 143 and 146 extends to one of the inputs of an OR gate 148. The output of the OR gate 148 is coupled directly to the input of the forward motor drive amplifier 141 and through an inverting amplifier 149 to the input of the reverse motor drive amplifier 142. The forward motor drive amplifier 141 is activated when the OR gate 148 outputs a voltage level signal, e.g., a high voltage level, in response to either one of the AND gates 143 or 146 being energized. The low voltage level signal output by the OR gate 148 when neither of the AND gates 143 or 146 are energized is inverted by the amplifier 149 and, hence, activates the reverse motor drive amplifier 142.

FIG. 6 also illustrates the manner in which the advance of the tape 11 may be started and stopped. A flip-flop 151 is set into a state by the application of a start command at terminal 89 which enables the motor drive amplifiers 141 and 142 to be energized. When the binary difference signal in the arithmetic unit 34 indicates a zero distance, D, i.e., the particular frame 12' is at the location 13, the line 114 is activated by, for example, a high voltage level signal which sets the flip-flop 151 in its other state which causes both the motor drive amplifiers to be de-energized, thereby, removing the drive from both of the reel drive motors 28 and 27. The input of an inverting amplifier 152 also is coupled to the line 114 so that if the voltage signal on the line 114 returns to a low level, for example, as would occur in the case of an overshoot, the flip-flop 151 is returned to its state which allows the motor drive amplifiers 141 and 142 to be energized.

From the foregoing description of a preferred embodiment of a programmable transport controller 10 of the present invention, it is seen the transport of a record medium 11 can be precisely controlled to position a particular one of its storage locations 12 rapidly whereby the access time of information storage systems can be greatly improved. Furthermore, the improved access time is achieved without the need of tachometers commonly employed to control the transport of record media while not increasing the complexity of the transport control system 10. While prior art record medium transport controllers are usually tailored to control a particular record medium transport by a particular transport mechanism, the transport controller 10 of the present invention is particularly suited to being programmed to control various record media transported by different transport mechanisms. The programmable transport controller 10 of the present invention enables the user to set the controller precisely according to the characteristics of the record medium 11 and transport mechanism 14 to be controlled, thereby, providing the user with a degree of flexibility ordinarily not available.

While the programmable controller 10 of the present invention has been described with reference to controlling the transport of a magnetic tape as it is advanced past a stationary magnetic head, the controller also can operate to control the transport of other record media transported relatively to a stationary or moving transduction means for transferring information between the record media and information processing systems. In embodiments of the latter form, the distance separating the storage locations of the record medium is detected to issue commands to cause the record medium and transduction means to be relatively transported at one of a set of selected relative speeds.

What is claimed is:

1. A method for controlling the relative transport of a record medium for storing information at discrete storage locations thereof and means for transduction of information, said record medium and transduction means relatively transported to position a particular storage location and the transduction means relative to each other for transferring information between the record medium and an information processing system, the record medium having detectable signals thereon from which the relative speed of the record medium and transduction means can be determined and indicative of the distance along the record medium separating any two of its discrete storage locations, the steps comprising:

detecting the speed and distance determinative signals on the record medium as the transduction means and record medium are relatively transported;

generating commands from the detected speed determinative signals to cause the record medium and transduction means to be relatively transported at one of different selected relative speeds; and changing the commands to cause the record medium and transduction means to be relatively transported at different ones of the selected relative speeds when the detected distance indicative signal represents different predetermined distances separating the particular storage location and the transduction means.

2. The method according to claim 1 wherein the record medium is transported to be advanced relative to the transduction means to position the particular storage location at a selected location relative to the transduction means, and commands are generated to cause the record medium to be advanced at the selected speeds.

3. The method according to claim 2 wherein the step of generating commands comprises generating first commands to cause the record medium to be advanced at a maximum possible speed when the detected distance indicative signal represents distances of record medium separating the particular storage location and the selected location in the direction of the transport of the record medium relative to the transduction means greater than a first predetermined distance, generating second commands to cause the record medium to be advanced at zero speed when the detected distance indicative signal represents distances of the record medium separating the particular storage location and the selected location in the direction of the transport of the record medium relative to the transduction means less than a second predetermined shorter distance, and generating third commands to cause the record medium to be advanced at different selected intermediate speeds between a low speed and the maximum speed when the detected distance indicative signal represents different ones of the predetermined distances intermediate the first and second predetermined distances, the record medium commanded to be advanced at lower ones of the selected intermediate speeds when shorter detected predetermined intermediate distances are indicated.

4. The method according to claim 3 wherein the step of generating third commands for causing the record medium to be advanced at the selected intermediate speeds comprises generating a reference signal for comparison with the detected speed determinative signal, comparing the detected speed determinative signal and the reference signal to indicate a difference between the actual speed of the record medium and the command selected speed, adjusting the speed commands when a speed difference is indicated to cause the record medium to be advanced at an actual speed equal to the selected speed, and changing either the detected speed determinative signal or the reference signal to change the commanded selected speed when the detected distance indicative signal represents the different predetermined intermediate lengths.

5. The method according to claim 4 wherein the speed determinative signal on the record medium is a signal of a selected number of cycles per unit length of the record medium productive of a detected speed determinative signal frequency proportioned to the actual speed of the record medium, the step of generating a reference signal includes generating a signal of a selected frequency, the step of comparing includes comparing the frequencies of the reference signal and detected speed determinative signal to indicate the difference between the actual speed of the record medium and the commanded selected speed, the step of adjusting the speed commands includes changing the frequency of the detected speed determinative signal by a rational number to be productive of a changed frequency which equals the reference signal frequency when the record medium is advanced at the commanded selected speed, and the step of changing either the detected speed determinative signal or the reference signal includes changing the rational number when the detected distance indicative signal represents the different predetermined distances so that lower detected speed determinative signal frequencies are productive of changed frequencies equal to the reference signal frequency at shorter ones of the detected predetermined distances.

6. The method according to claim 5 wherein the reference signal is generated at a frequency which is greater than that of the detected speed determinative signal when the record medium is advanced at the lowest commanded selected speed, the step of changing the frequency of the detected speed determinative signal includes dividing the frequency of detected speed determinative signal by a selected divisor number, and the step of changing the rational number includes changing the frequency divisor to lower selected numbers when the detected distance indicative signal represents shorter one of the predetermined distances.

7. The method according to claim 1 wherein the speed determinative signal on the record medium is a timing signal placed thereon at a selected frequency productive of a detected speed representative signal frequency proportioned to the actual relative speed between the record medium and transduction means, the distance indicative signals on the record medium are unique address signals each identifying one of uniformly sized discrete storage locations of the record medium with consecutive storage locations addressed sequentially; and wherein the step of generating speed commands comprises generating a reference signal of a selected frequency, comparing frequencies representative of the detected timing signal frequency and of the reference signal frequency to indicate the difference between the actual relative speed and a commanded selected relative speed, and generating corresponding corrective commands when a speed difference is indicated to cause the record medium and transduction means to be relatively transported at the selected relative speed; and the step of changing the selected speed commands comprises comparing the detected address signals to an address signal of a particular storage location to indicate the number of storage locations separating the storage location identified by the detected address signal and the particular storage location, and changing the frequency of either the detected timing signal or the reference signal to cause the record medium and transduction means to be relatively transported at different selected relative speeds when separations of different predetermined numbers of storage locations are indicated, the record medium and transduction means commanded to be relatively transported at lower ones of the selected relative speeds when separations of smaller predetermined numbers of storage locations are indicated.

8. The method according to claim 7 wherein the step of generating speed commands comprises generating first commands to cause the record medium and transduction means to be relatively transported at the maximum possible relative speed when the indicated storage location separation is greater than a first predetermined number of storage locations, generating second commands to cause the record medium and transduction means to be relatively transported at zero relative speed when the indicated storage location separation is less than a second predetermined smaller number of storage locations, and generating third commands to cause the record medium and transduction means to be relatively transported at different selected intermediate relative speeds between a low speed and the maximum speed when the indicated storage location separation is different ones of the predetermined numbers of storage locations intermediate the first and second numbers of storage locations.

9. The method according to claim 7 wherein the record medium and transduction means are relatively transported by a transport mechanism having a particular nominal deceleration characteristic, the step of changing the frequency of either the detected timing signal or the reference signal comprises changing the frequency of the detected timing signal as the record medium and transduction means are relatively decelerated according to the nominal deceleration characteristic to be productive of a changed frequency which equals the reference signal frequency when the record medium and transduction means are relatively transported at just greater than the commanded selected relative speed, lower detected timing signal frequencies being productive of changed frequencies equal to the reference signal frequency at smaller ones of the predetermined numbers of storage locations.

10. The method according to claim 9 wherein the distance represented by each of the indicated storage location separations at which the frequency of the detected timing signal is changed is selected relative to the commanded speed of the record medium just prior to effecting the frequency change to be at least close to equalling the square of the commanded speed when factored with twice the nominal deceleration characteristic.

11. Apparatus for controlling a transport mechanism for transporting a record medium and means for transduction of information relative to each other, said record medium storing information at discrete storage locations thereof, said transductions means coupled to transfer information between the record medium and an information processing system, the record medium having thereon a detectable timing signal of a selected number of cycles per unit length of the record medium productive of a detected timing signal frequency proportional to the relative speed of the record medium and the transduction means, and the record medium further having detectable unique address signals thereon each identifying one of the discrete storage locations with consecutive storage locations addressed sequentially whereby the number of discrete storage locations separating any two of its storage locations can be determined from each detected address signal, the combination comprising:

means for comparing address signals detected on the record medium as it and the transduction means are relatively transported with an address signal of a particular storage location productive of signals indicative of the number of storage locations separating the particular storage location and the storage locations identified by the detected address signals, means for comparing the frequency of the timing signal detected on the record medium as it and the transduction means are relatively transported with a reference signal frequency productive of commands to cause the transport mechanism to relatively transport the record medium and transduction means at one of different selected relative speeds, and means responsive to the address signal comparison means for changing the frequency of either the detected timing signal or reference signal provided to the frequency comparison means when the storage location separation signal is indicative of different predetermined numbers of storage locations, the frequency comparison means responsive to the frequency changes to produce commands to cause the transport mechanism to relatively transport the record medium and transduction means at different ones of the selected relative speeds.

12. The apparatus according to claim 11 further including means responsive to the address signal comparison means and the frequency comparison means to generate transport drive signals coupled to the transport mechanism to cause the record medium and transduction means to be relatively transported, said drive signal generating means responsive to generate drive signals to cause the transport mechanism to relatively transport the record medium and transduction means at a maximum possible speed when the storage location separation signal provided by the address signal comparison means is indicative of numbers of storage locations greater than a first predetermined number, at zero speed when the storage location separation signal is indicative of number of storage locations less than a second predetermined smaller number, and at different selected intermediate speeds between a low speed and the maximum speed when the storage location separation signal is indicative of different ones of the predetermined numbers of storage locations intermediate the first and second numbers of storage locations.

13. The apparatus according to claim 11 wherein the address signals are in a number code format, and the address comparator is an arithmetic unit for processing the detected and particular address signals to provide a difference number as the storage location separation signal.

14. The apparatus according to claim 13 wherein the frequency changing means is a means for changing the frequency of the detected timing signal by a rational number to be productive of a changed frequency which equals the reference signal frequency when the record medium and transduction means are relatively transported at the commanded selected relative speed, the frequency changing means is responsive to the arithmetic unit to change the detected timing signal frequency by different rational numbers when the arithmetic unit's difference number represents different ones of the predetermined numbers of storage locations so that lower detected timing signal frequencies are productive of changed frequencies equal to the reference signal frequency at smaller ones of the predetermined numbers of storage locations.

15. The apparatus according to claim 14 wherein the frequency of the reference signal is selected to be less than that obtained from the detected timing signal for comparison when the record medium and transduction means are relatively transported at the lowest commanded selected relative speed, and the means for changing the frequency of the detected timing signal includes a frequency divider receiving the detected timing signal and dividing its frequency by a selected divisor number, the divider responsive to the difference number provided by the arithmetic unit to divide the timing signal frequency by lower divisor numbers when the difference number represents smaller ones of the predetermined numbers of storage locations.

16. The apparatus according to claim 15 wherein the detected timing signal is a train of pulses, the frequency divider is a counter having a predetermined capacity for counting the pulses of the timing signal pulse train and issuing an output pulse each time its count reaches capacity for comparison with the reference signal, and the means for changing the frequency of the detected timing signal includes a gating circuit for presetting a count into the counter, the gating circuit responsive to the arithmetic unit to be set for presetting a certain count in the counter corresponding to a particular range of difference numbers provided by the arithmetic unit, said gating circuit set by the arithmetic unit for presetting different lower counts in the counter for different ranges of lower difference numbers, the gating circuit responsive to the counter to preset the certain count in the counter each time the counter outputs a pulse.

17. The apparatus according to claim 11 further including means for adjusting the frequency changing means for changing the predetermined numbers of storage locations at which the different selected speed commands are produced.

18. The apparatus according to claim 11 wherein the record medium has a certain number of discrete storage locations per unit length thereof, and further including means for selectively providing different reference signal frequencies for controlling the relative transport of the transduction means and different record media having different numbers of discrete storage locations per unit length thereof.

19. The apparatus according to claim 11 wherein the address signals are in a time code format wherein a certain number of storage locations represent one second, and further including means for setting the address comparison means to perform comparisons between address signals in different time code formats wherein different numbers of storage locations represent one second.

20. The apparatus according to claim 11 further including means for selectively providing different reference signal frequencies, and means for selectively adjusting the frequency changing means to effect the frequency changes in response to storage location separation signals indicative of different sets of predetermined numbers of storage locations.

21. The apparatus according to claim 11 wherein the record medium is advanced by a transport mechanism having a particular deceleration characteristic, and the distance represented by each of the storage location separation signals at which the frequency change means effects the frequency change is selected relative to the commanded selected speed of the record medium just prior to effecting the frequency change to be approximately equal to the square of the commanded selected speed when factored with twice the deceleration characteristic.

* * * * *